(12) United States Patent
Togami et al.

(10) Patent No.: US 7,350,984 B1
(45) Date of Patent: Apr. 1, 2008

(54) OPTICAL TRANSCEIVER MODULE ARRAY SYSTEM

(75) Inventors: Chris Kiyoshi Togami, San Jose, CA (US); Gary Dean Sasser, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/716,149

(22) Filed: Nov. 17, 2003

Related U.S. Application Data

(60) Provisional application No. 60/426,546, filed on Nov. 15, 2002.

(51) Int. Cl.
  G02B 6/36 (2006.01)
  G03B 6/42 (2006.01)
(52) U.S. Cl. .................. 385/89; 385/92; 385/139
(58) Field of Classification Search .......... 385/24, 385/53, 88, 92, 139
  See application file for complete search history.

(56) References Cited

U.S. PATENT DOCUMENTS

| | | | |
|---|---|---|---|
| 6,305,848 B1 * | 10/2001 | Gregory | 385/53 |
| 6,358,066 B1 * | 3/2002 | Gilliland et al. | 439/76.1 |
| 6,364,534 B1 | 4/2002 | Lampert | |
| 6,419,399 B1 * | 7/2002 | Loder et al. | 385/53 |
| 6,478,472 B1 | 11/2002 | Anderson et al. | |
| 6,517,382 B2 * | 2/2003 | Flickinger et al. | 439/607 |
| 6,533,470 B2 | 3/2003 | Ahrens | |
| 6,692,159 B2 | 2/2004 | Chiu et al. | |
| 6,789,958 B2 * | 9/2004 | Ahrens et al. | 385/92 |
| 6,851,867 B2 * | 2/2005 | Pang et al. | 385/88 |
| 6,854,894 B1 | 2/2005 | Yunker et al. | |
| 6,863,446 B2 | 3/2005 | Ngo | |
| 7,118,281 B2 | 10/2006 | Chiu et al. | |
| 2003/0012485 A1 * | 1/2003 | Neeley et al. | 385/16 |
| 2003/0021552 A1 * | 1/2003 | Mitchell | 385/92 |
| 2003/0044129 A1 * | 3/2003 | Ahrens et al. | 385/92 |
| 2003/0142917 A1 * | 7/2003 | Merrick | 385/53 |
| 2004/0062486 A1 | 4/2004 | Tanaka et al. | |

OTHER PUBLICATIONS

Co-pending U.S. Patent Application to Chris Kiyoshi Togami and Gary Dean Sasser, U.S. Appl. No. 10/715,576, filed Nov. 17, 2003 (29 pages), and 9 sheets of accompanying drawings.

* cited by examiner

*Primary Examiner*—Michelle R. Connelly-Cushwa
(74) *Attorney, Agent, or Firm*—Workman Nydegger

(57) ABSTRACT

An array system that enables compact positioning of opto-electronic modules, such as optical transceiver modules, within an optical device is disclosed. The array system increases the optical port density of the modules within the optical device, which can comprise an optical switch, an optical router, or the like. In one embodiment, the array system includes a host board and a plurality of daughter cards that connect with the host board edge-on in a perpendicular orientation. A cage is mounted to each daughter card, and an optical transceiver module is received into each cage to electrically connect with a connector receptacle that is positioned on the daughter card. A connectorized optical fiber can be connected to the optical ports of the transceiver using a release sleeve that enables engagement and disengagement of the optical fiber without difficulty despite the increased port density.

28 Claims, 9 Drawing Sheets

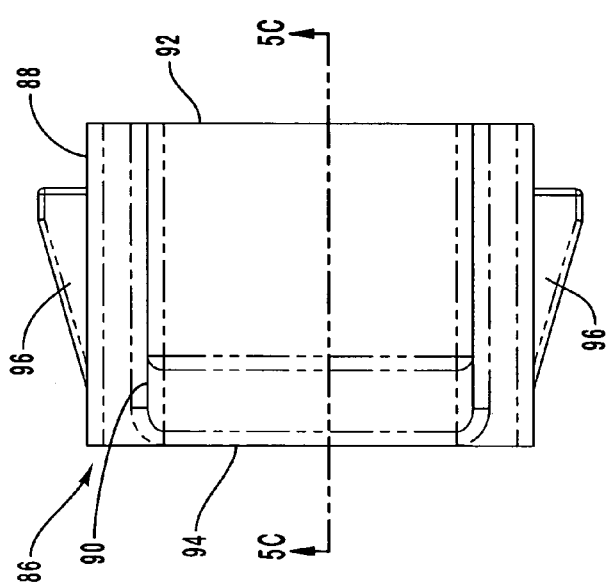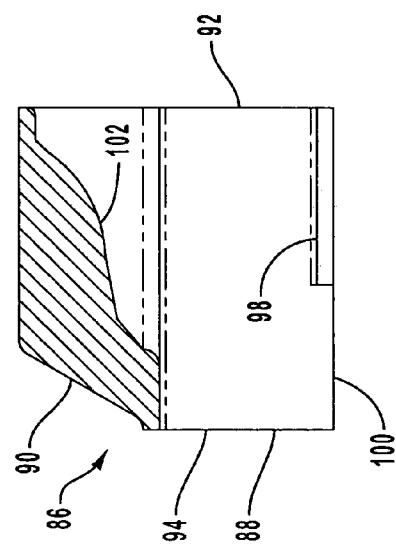

OPTICAL TRANSCEIVER MODULE ARRAY SYSTEM

CROSS-REFERENCE TO RELATED APPLICATIONS

This application claims the benefit of U.S. Provisional Application No. 60/426,546, filed Nov. 15, 2002, which is incorporated herein by reference in its entirety.

BACKGROUND OF THE INVENTION

1. The Field of the Invention

The present invention generally relates to optoelectronic modules, including optical transceiver modules. More particularly, the present invention relates to an optoelectronic module array system for minimizing the amount of space required in positioning such apparatus within an optical device.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal (containing digital information or other data) from a network device, such as a computer, and converts the electrical signal via a laser and related components to a modulated optical signal. The optical signal can then be transmitted in a fiber optic cable via the optical communications network to a reception node of the network. Upon receipt by the reception node, the optical signal is fed to another optical transceiver that uses a photodetector and related components to convert the optical signal back into electrical signals. The electrical signals are then forwarded to a host device, such as a computer, for processing. The optical transceivers described above have both signal transmission and reception capabilities; thus, the transmitter portion of an optical transceiver can convert an incoming electrical signal into an optical signal, while the receiver portion of the transceiver can convert an incoming optical signal into an electrical signal.

In a typical transceiver, the components responsible for transmitting and receiving optical signals are located in a transmitting optical sub assembly ("TOSA") and a receiving optical sub assembly ("ROSA"), respectively. Specifically, the laser and associated components for producing an optical signal are located in the TOSA, while the photodetector and related components for receiving an optical signal are located in the ROSA. Optical signals are introduced to the ROSA and emitted from the TOSA via two respective optical ports defined in the optical transceiver module. The optical ports are typically arranged to be side-by-side when the bottom surface of the transceiver module is mounted within a device.

Various optical devices employ a plurality of optical transceivers to perform the optical transmission and reception operations described above. For instance, optical devices such as switches and optical routers position a plurality of optical transceiver modules together within the device to enable several optical signal channels to be processed simultaneously. The plurality of optical transceivers are typically placed side-by-side along one or more edges of a host board within the device.

An ever-present goal in the art to increase the number of optical ports available exists when implementing fiber optic systems. This goal extends to optical devices, such as optical switches, routers, and similar devices that utilize optical transceiver modules and other optoelectronic devices having such optical ports.

Though optical transceiver design is largely governed by multi-source agreements ("MSAs"), such as the SFP and XFP MSA standards, which determine the physical dimensions of such modules, it has nonetheless been desirable in the past to reduce the amount of space occupied by the transceiver modules in order to increase optical port density. This is typically achieved in known designs by packing adjacent optical transceiver modules in close proximity to one another on the host board of the optical device and mounting the bottom surfaces of each module to the host board. However, this method alone results in only partial success in increasing optical port density.

In a further effort to increase the optical port density of multiple optical transceiver modules, some known optical device designs mount the bottom surfaces of a first row of adjacent transceiver modules to an upper surface of the host board, and the bottom surfaces of a second row of adjacent transceivers to the host board lower surface. While this configuration can also improve transceiver module density, it nonetheless substantially improves neither inter-module spacing of adjacent transceiver modules nor corresponding optical port density.

In light of the above discussion, a need exists for an optical transceiver module array that overcomes the above challenges. In particular, implementations and methods are sought by which optical transceiver modules can be positioned so as to maximize the density of optical ports of the transceiver modules within an optical device.

BRIEF SUMMARY OF THE INVENTION

The present invention has been developed in response to the above and other needs in the art. Briefly summarized, embodiments of the present invention are directed to an optoelectronic module array system for use in optical devices and other environments. The array system of the present invention is configured to increase the density of the optoelectronic modules, such as optical transceiver modules, within the optical device, thereby correspondingly increasing the density of optical ports of the transceiver modules. This results in reduced space requirements within the optical device, and also enables the employment of relatively larger numbers of optical transceiver modules per unit dimension within the optical device or other environment.

In one embodiment, the present array system is composed of various components, including a host board, a plurality of daughter cards mounted to the host board, and a plurality of optical transceiver modules. The host board is positioned within a host device, such as an optical switch, optical router, or other device.

Each of the plurality of daughter cards are positioned parallel to one another in a spaced-apart configuration, then mounted edge-on in a perpendicular orientation with respect to the surface of the host board. A cage is mounted to a like first side of each of the daughter cards.

Each of a plurality of optical transceiver modules, or other type of optoelectronic device, is received into a corresponding one of the cages mounted on each of the daughter cards. The transceiver modules are mounted within the cages of each daughter card in a sideways, or edge-on orientation, wherein an otherwise bottom surface of each transceiver module is positioned adjacent the first side of each daughter card. This orientation in turn positions two optical ports of each transceiver module in a top-over-bottom configuration. The daughter cards are spaced such that the distance between each transceiver module is minimized.

The configuration described above minimizes inter-module spacing of the transceiver modules, or other optoelectronic device, which in turn increases the density of the transceiver modules in a given space. As a result, optical port density is also increased, which leads to greater signal transfer capacity, smaller optical device sizes, or both.

In one embodiment, release sleeves are employed in connection with optical fiber connectors that pluggably interface with each transceiver module to allow for ready insertion and removal of the connector from the transceiver module.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5B is a top view of the release sleeve of FIG. 5A;

FIG. 5C is a cross sectional side view of the release sleeve of FIG. 5B taken along the lines 5C-5C;

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-6B depict various features of embodiments of the present invention, which is generally directed to an optical transceiver module array system. The present system can facilitate increased optical port density by providing an improved small-separation placement scheme among a plurality of optical transceiver modules within an optical device, such as an optical switch, optical router, or other optical device. Note that the configurations of the present invention to be shown and described herein and in the accompanying figures are merely examples of the broader principles taught by the present invention. Accordingly, though the present invention will be described in connection with optical transceiver modules, it is appreciated that a variety of other optoelectronic devices can also benefit from the teachings discussed herein.

Figure 1:
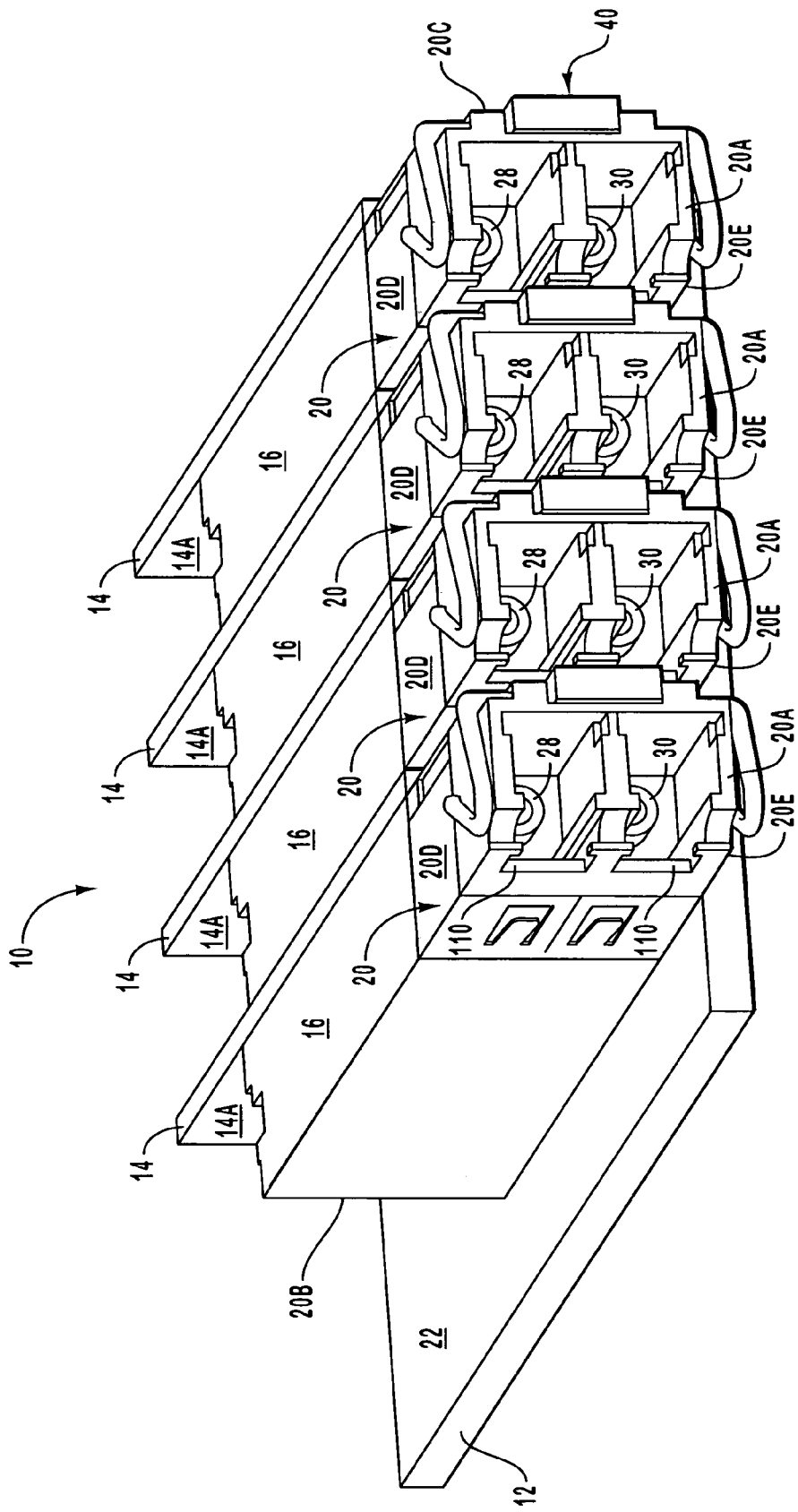
FIG. 1 is a perspective view of the optical transceiver module array system according to one embodiment of the present invention.
Figure 2:
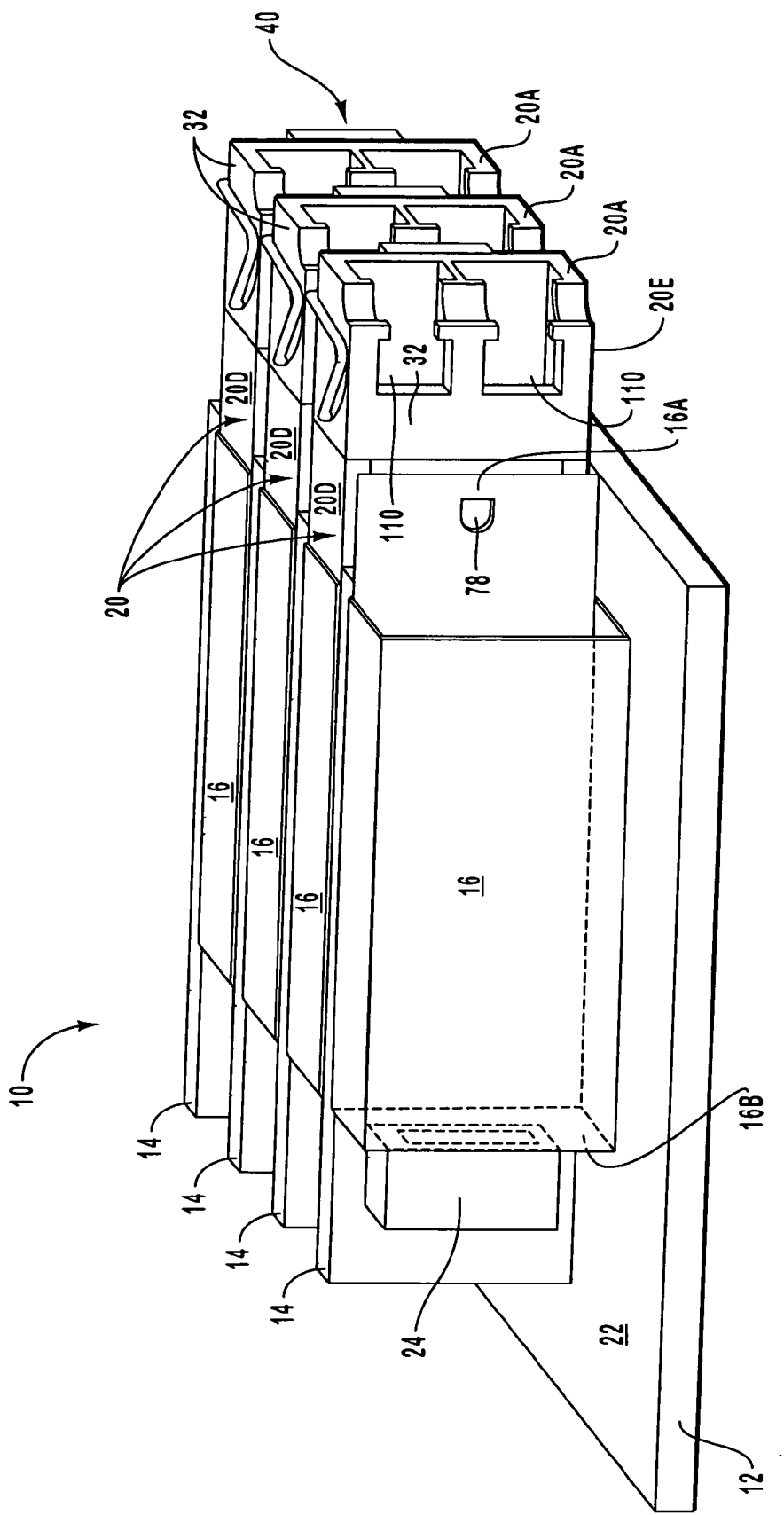
FIG. 2 is another perspective view of the optical transceiver module array system of FIG. 1.

Reference is first made to FIGS. 1 and 2, which depict various features of one embodiment of the present invention. Specifically, FIGS. 1 and 2 show an optical transceiver array system ("array system"), generally designated at 10. The array system 10 has various components, including a host board 12, a plurality of daughter cards 14, a plurality of cages 16, and a plurality of optical transceiver modules ("transceivers") 20. Each of these components cooperates to provide a high density transceiver arrangement that is beneficial in increasing the number of transceiver optical ports for a given space, as will be seen.

The host board 12 includes a top mounting surface 22 that provides a surface upon which the other components of the system array 10 can be disposed. The host board 12 can have one of a variety of areal dimensions, and can be included within an optical device (not shown), such as an optical switching device, optical router, computing device or the like, or can be self-supporting. The host board 12 can further include a variety of electrical interconnects and conductive pathways for providing electrical interfaces between the optical device and the transceivers 20, as will be discussed.

The host board 12 is connected to each of the plurality of daughter cards 14, as shown in FIGS. 1 and 2. In particular, each daughter card 14 is mounted edge-on with the host board 12 such that a planar first side 14A of each daughter card is perpendicular to the host board top mounting surface 22. The daughter cards 14 are mounted parallel to and in series with one another in a spaced-apart configuration along an edge of the host board 12, as seen in the figures. The separation between adjacent daughter cards 14 is such that the spacing between adjacent optical transceivers 20 is minimized, as discussed below. The daughter cards 14 can be composed of any suitable material to allow mounting of other array components, as described below.

The first side 14A of each daughter card 14 provides a mounting surface for a respective one of the plurality of cages 16. Composed of metal or other suitable material, each cage 16 is coupled in the present embodiment to its respective daughter card 14 on the first side 14A thereof. In other embodiments, however, it is possible to mount the cage to the host board 12, either in addition or alternatively to the daughter card mounting. Each cage 16 in the present embodiment defines a hollow rectangular volume and includes open first and second ends 16A and 16B, respectively.

The shape of the cages 16 is configured as described above to provide a receptacle for each of the plurality of transceivers 20, as seen in FIGS. 1 and 2. In detail, each of the transceivers 20 has a first end 20A and a second end 20B, and is received through the first end 16A of a respective one of the cages 16 to seat therein. In this position, each transceiver 20 is received within the respective cage 16 and daughter card 14 in a specified orientation with respect to the host board 12. Further, each transceiver 20 is electrically connected to the host board 12 via the daughter card 14. Specifically, the first side 14A of each daughter card 14 includes a connector receptacle 24 positioned near the second end 16B of each cage 16 for receiving a card-edge connector 26 (FIGS. 3A, 3B) extending from the second end 20B of the transceiver 20. Each connector receptacle 24 is then electrically connected via conductive pathways and electrical interfaces on the daughter card 14 (not shown) to the host board 12, as appreciated by those skilled in the art. In this configuration, the transceivers 20 are referred to as "pluggable" transceivers. In other embodiments, however, the transceivers can include pins extending therefrom, wherein the pins interconnect with the daughter card and/or the host board.

In addition, each cage 16 is configured to provide a ground plane for each transceiver 20, as well as serve as a supplemental shield, in addition to the outer shell of the transceiver, against electromagnetic interference ("EMI"). In addition to these connections, other conductive and electrical schemes can be employed in connection with the present invention. For example, in one embodiment electrical connection between the transceiver and the host board can be established directly from the transceiver to the host board.

Figure 4:
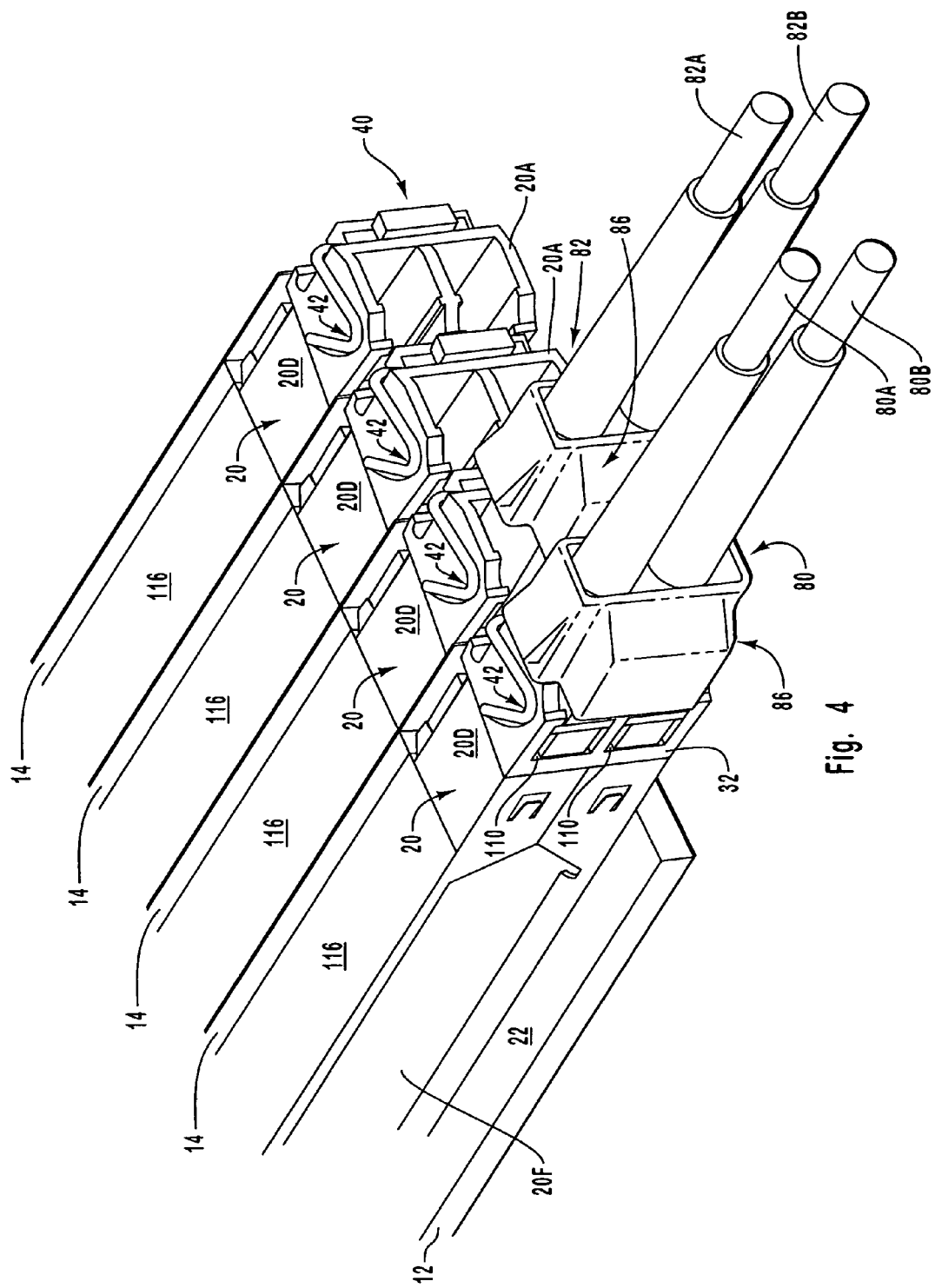
FIG. 4 is a perspective view of the optical transceiver module array system of FIG. 1 having optical fibers connected thereto.

The plurality of cages 16 shown in FIGS. 1 and 2 are commercially available. However, it is appreciated that custom cages can be configured and employed in the present system. One example of a custom cage is depicted in FIG. 4, which shows a three-sided cage that further reduces transceiver spacing. Moreover, in one embodiment a multi-slot custom cage can be configured to serve the functionality of both the cage and the daughter card of FIGS. 1 and 2. In such a case, the daughter cards can be eliminated from the system. In yet another embodiment, cages can be mounted to either side of the daughter cards, if desired, or one side of a daughter card can be configured and sized to support multiple cages. These and other similar modifications to the present invention are therefore contemplated.

Each transceiver 20 in the present embodiment that is received into one of the cages 16 includes two optical ports 28 and 30 formed on an optical interface portion 32 that is located at the first end 20A of the transceiver. The optical ports 28 and 30 respectively correspond to a transmission optical subassembly ("TOSA") and a receiving optical subassembly ("ROSA") (not shown) that are contained within each transceiver 20. As shown, the orientation of each transceiver within the cages 16 represents an approximate 90° rotation from transceiver orientations in known transceiver implementations. This orientation places each transceiver edge-on such that its width dimension is perpendicular to the top mounting surface 22 of the host board 12. This results in the optical ports 28 and 30 being positioned in a top-over-bottom vertical configuration such that an imaginary line passing through the central portions of the optical ports intersects the host board 12 substantially perpendicularly.

It is noted that, in FIGS. 1 and 2, four sets of optical transceivers 20, cages 16, and daughter cards 14 are included in the array system 10. However, it is appreciated that the present system is scalable such that a greater or lesser number of sets of these components can be included. In one embodiment, for example, 48 optical transceivers can be included in an array system configured according to the present invention. Such an array system will, because of the present design, substantially increase optical port density on the host board. It is further noted that the transceivers in FIG. 1 are all oriented alike. However, in other embodiments each transceiver can have a differing orientation with respect to the other transceivers.

In the present embodiments, the transceivers shown in FIGS. 1 and 2 conform to the SFP Multi-Source Agreement ("MSA"). However, transceivers conforming to one or more of a variety of form factors, such as the XFP standard, can also be employed with the present system. Additionally, transceivers of differing form factors can be positioned together in the same array system, if desired.

As mentioned, because of the edge-on transceiver orientation shown in FIGS. 1 and 2, a compact transceiver array geometry is achieved by the present array system, which results in increased optical port density in the array system. These features beneficially result in enhanced functionality for the optical device (not shown) that contains the present array, as well as reduced effort and expense in the manufacturing of the optical device.

Figure 3A:
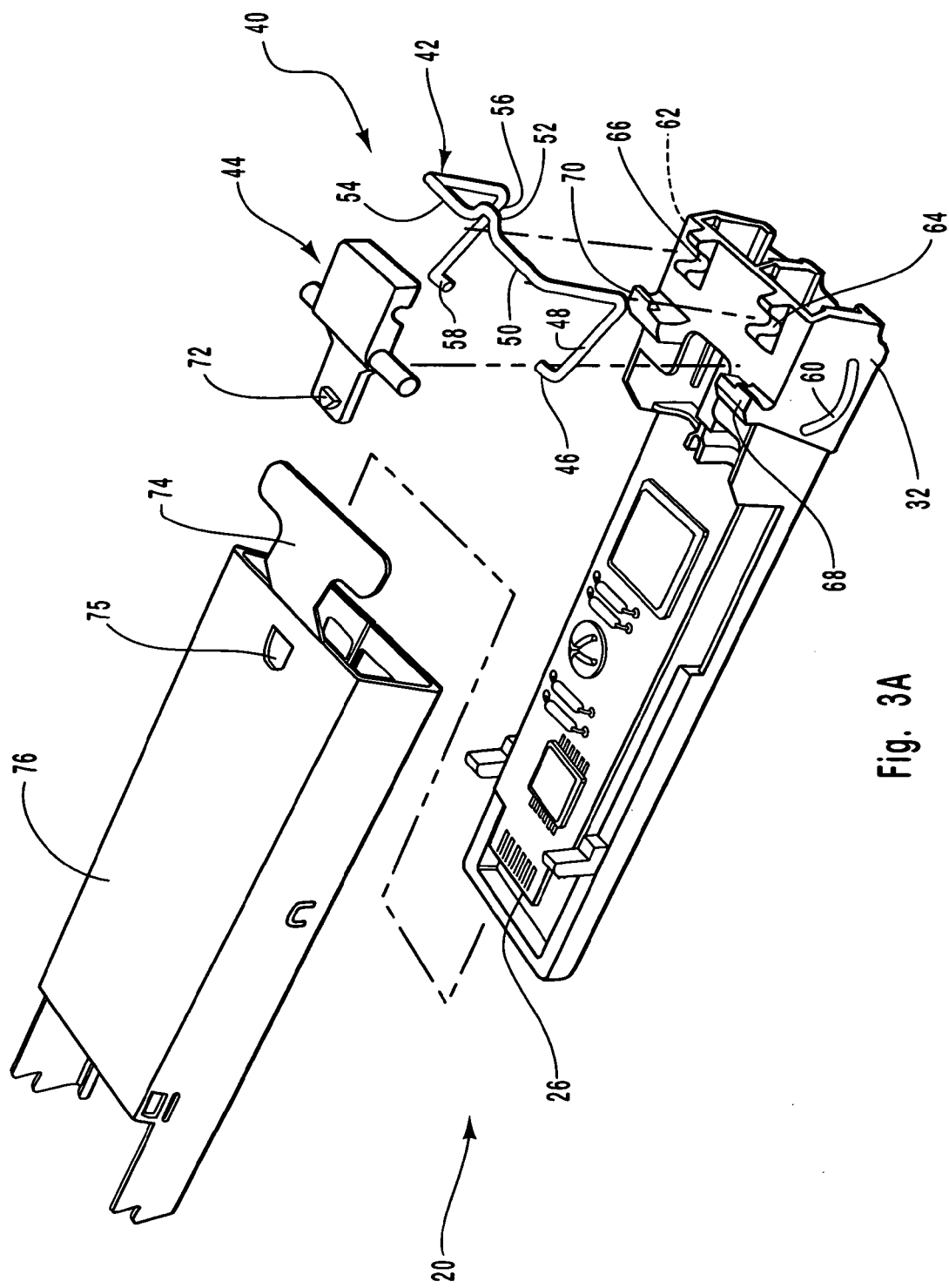
FIG. 3A is an exploded perspective view of a representative optical transceiver module, including a latching mechanism employed in connection with one embodiment of the present invention.
Figure 3B:
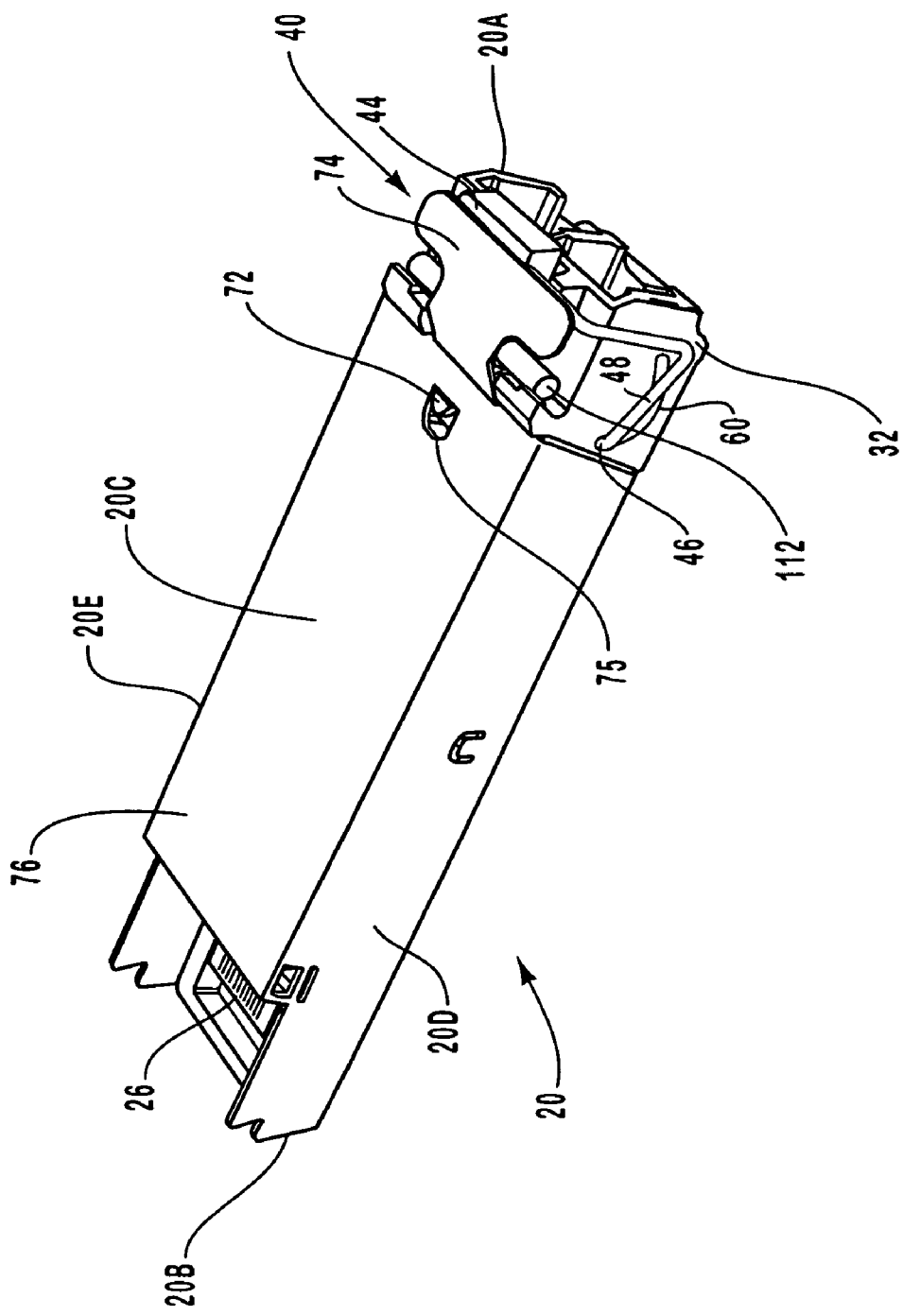
FIG. 3B is an assembled view of the optical transceiver module and latching mechanism of FIG. 3A.

Together with FIGS. 1 and 2, reference is now also made to FIGS. 3A and 3B, which depict various features of a latching mechanism 40 that is included with each transceiver 20 of the embodiment shown in FIGS. 1 and 2. The latching mechanism 40 is employed to releasably secure each transceiver 20 within its designated location in the array system 10, thereby enabling each transceiver to be selectively inserted into and removed from the array system 10 when desired.

As partially seen in FIGS. 1 and 2, the latching mechanism 40 is located on a side surface 20C of each transceiver 20, at the optical interface portion 32 thereof. For purposes of illustration, the transceiver 20 shown in FIGS. 3A and 3B is rotated approximately 90° counter-clockwise from the orientation of the transceivers shown in FIGS. 1 and 2 to enable a full view of the latching mechanism 40 to be realized. Note that the transceiver 20 of FIGS. 3A and 3B is representative of any one of the transceivers shown in the array system 10 of FIGS. 1 and 2.

FIGS. 3A and 3B depict various components of the latching mechanism 40, including a bail 42 and a pivot block 44. The bail 42 in the illustrated embodiment is a shaped piece of rigid wire. The bail 42 has various segments, including a first end 46, a V-shaped angled first portion 48, a first shoulder 50, a cam 52, a second shoulder 54, a V-shaped angled second portion 56, and a second end 58. The bail 42 is so shaped as to allow it to operate as a user-actuated portion for inserting and removing the transceiver 20 from the array system 10.

The first end 46 of the bail 42 is received into a curved recess 60 that is defined in a top surface 20D, while the second end 58 of the bail is received into a correspondingly curved recess 62 defined on a bottom surface 20E. The curved recesses 60 and 62 enable movement of the first and second bail ends 46 and 58 to occur without exposure of the ends to other surfaces so as to prevent possible snagging thereof.

The first and second shoulders 50 and 54 of the bail 42 are received into corresponding retention slots 64 and 66 defined on the transceiver side surface 20C such that the cam 52 is interposed between the retention slots and such that pivoting of the bail 42 a about the retention slots can occur. The pivot block 44 is positioned over the cam 52 of the bail 42, and is received into corresponding pivot points 68 and 70 defined in the transceiver side surface 20C. The pivot block 44 includes a lock pin 72 that moveably extends through a hole 75 defined in an outer housing 76 of the transceiver 20. A leaf spring 74 defined from the outer housing 76 on the transceiver side surface 20C compressively engages the pivot block 44 to secure the pivot block while enabling it to pivot about the pivot points 68 and 70.

FIG. 3B shows the latching mechanism 40 as assembled as part of the transceiver 20. As noted above, the latching mechanism 40 of each transceiver 20 releasably secures the transceiver in position within the array system 10 shown in FIGS. 1 and 2. In detail, FIG. 3B shows the latching mechanism 40 in a latched configuration, wherein the bail 42 is positioned such that the cam 52 thereof causes no pivoting of the pivot block 44 to occur. In this latched configuration, the leaf spring 74 biases the pivot block 44 such that the lock pin 72 extends through the hole 75 in the outer housing and engages a hole 78 of the cage 16 (FIG. 2) when the transceiver is positioned in the array system 10, as shown in FIG. 1. Alternatively, the hole 78 can be defined in another structure, such as the daughter card 14.

To disengage one of the transceivers 20 from position within the array system 10, the bail 42 is rotated toward the first end 20A of the transceiver. This can be accomplished by a user grasping the bail 42 at the first and second angled portions 48 and 56 to cause the rotation. This in turn causes the first and second bail ends 46 and 58 to move from their positions shown in FIG. 3B and travel along the curved recesses 60 and 62 as the bail is swung out toward the transceiver first end 20A. This movement of the bail 42 causes the bail cam 52 to cause the pivot block 44 to pivot such that the lock pin 72 disengages from the hole 78 in the cage 16. After disengagement of the lock pin 72 from the cage hole 78, the transceiver 20 can be removed from the array system by a pulling force from a user on the bail 42.

When it is desired to insert one of the transceivers 20 into the array system 10, a user can rotate the bail 42 away from the first end 20A of the transceiver by grasping the bail at the first and second angled portions 48 and 56. This action disengages the bail cam 52 from the pivot block 44, which fully extends the lock pin through the hole 75 defined in the transceiver outer housing 76. The transceiver 20 can then be inserted into its place, at which point the lock pin 72 can engage the hole 78 of the cage, thereby locking the transceiver in place. In this way, each transceiver can be selectively and individually inserted into and removed from the array system as desired. Further details regarding the latching mechanism described herein can be found in U.S. Pat. No. 6,439,918 B1, entitled "Electronic Module Having an Integrated Latching Mechanism," filed Oct. 4, 2001, which is incorporated herein by reference in its entirety. Notwithstanding the above discussion, however, it is appreciated that latching mechanisms having other structures and configurations can also be employed in embodiments of the array system. Moreover, a latching mechanism that is employed with the array system described herein can be located in locations other than that shown and described above.

Reference is now made to FIG. 4. As shown, the array system 10 includes the four transceivers 20 that are each adjacent one of the daughter cards 14 described above, and positioned on the host board 12. Note that the array system 10 includes cages 116 that are three-sided, in contrast to the four-sided cages 16 shown in FIGS. 1 and 2. The cages 116 can be used in embodiments of the present invention to further minimize spacing between the transceivers 20. In this configuration, then, a side surface 20F of the left-most transceiver 20 is shown.

FIG. 4 additionally shows first and second connectorized optical fiber sets 80 and 82 that are each in differing connective states with the optical interface portion 32 of two of the transceivers 20 of the array system 10. In detail, the first connectorized optical fiber set 80 is shown fully coupled with the optical interface portion 32 of the respective transceiver 20 such that first and second optical fibers 80A and 80B of the set are optically coupled with the optical ports 28 and 30 of the transceiver. In contrast, the second connectorized optical fiber set 82 is shown partially coupled with the optical interface portion 32 of its respective transceiver 20. As such, the first and second optical fibers 82A and 82B are not yet fully coupled with optical ports 28 and 30, respectively.

Each of the first and second connectorized optical fiber sets 80 and 82 includes a standard LC duplex connector that is fitted with a release sleeve 86 that facilitates engagement and disengagement of the optical fiber sets to and from respective transceivers 20. Such engagement and disengagement can otherwise be difficult to achieve, given the reduced clearance between the optical ports 28 and 30 of adjacent transceivers 20 in the array system 10. Thus, the release sleeves 86 facilitate ease of operation with regard to the array system 10.

Figure 5A:
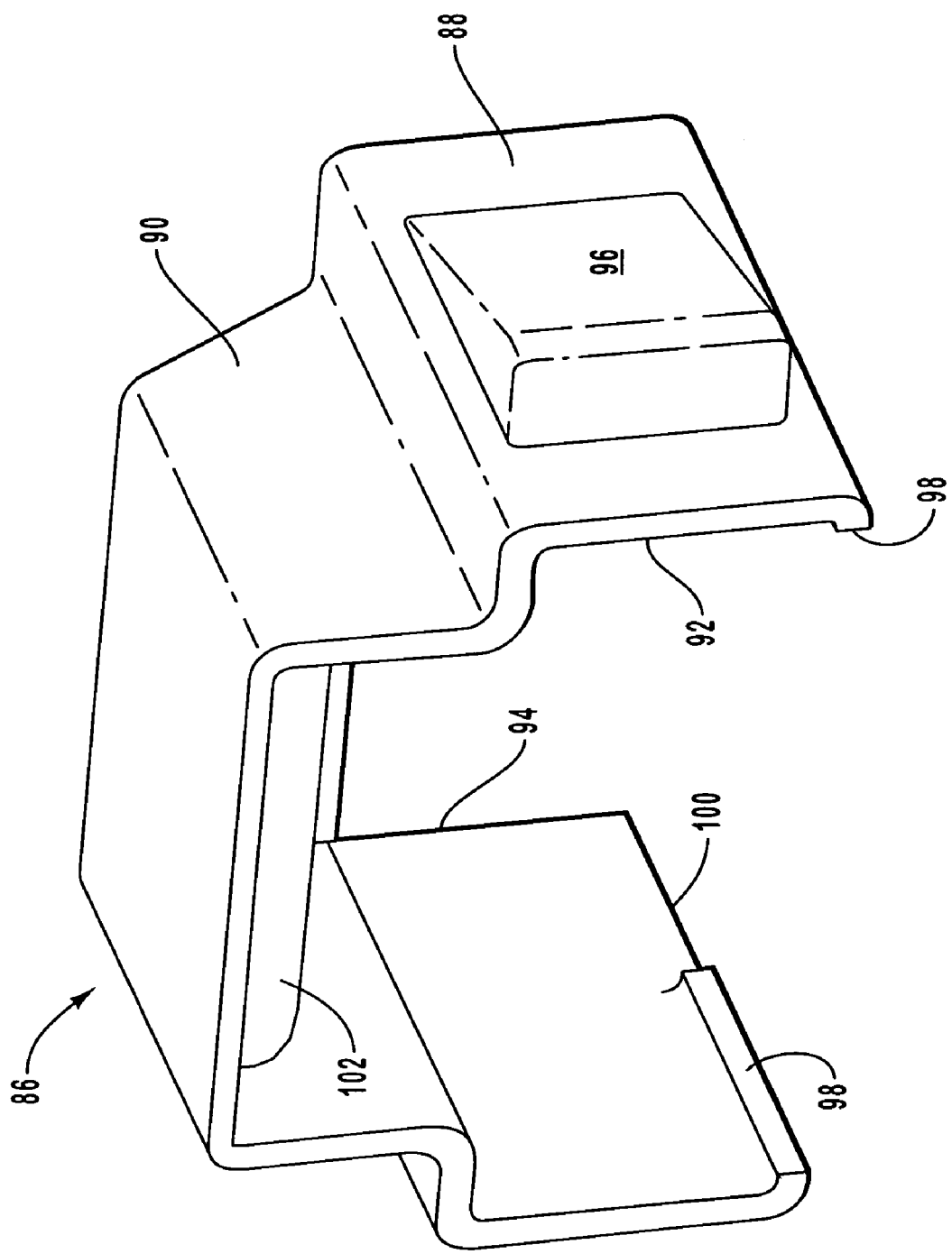
FIG. 5A is a perspective view of one embodiment of a release sleeve employed in connection with the present invention.

Reference is now made to FIGS. 5A-5C in describing various details regarding the release sleeve 86. In particular, the release sleeve 86 includes a substantially rectangular body 88 having a raised portion 90. In the illustrated embodiment, the raised portion is laterally more narrow than the body 88. The body 88 and raised portion 90 thereof cooperate to define a first open end 92, while the body also defines a second open end 94. The bottom portion of the body 88 is also open. Opposing lateral sides of the body 88 include extended portions 96 to assist in handling the release sleeve 86. Two lips 98 extend inwardly toward one another from a bottom edge 100 of the body 88 for engaging the LC duplex connector 104 (FIG. 6A).

As best seen in FIG. 5C, the raised portion 90 defines a complexly curved top inner surface 102. This curved top inner surface 102 includes both convex and concave curve portions to form a cam surface that is used to selectively engage and disengage portions of the connectorized optical fiber sets, as will be seen below.

Figure 6A:
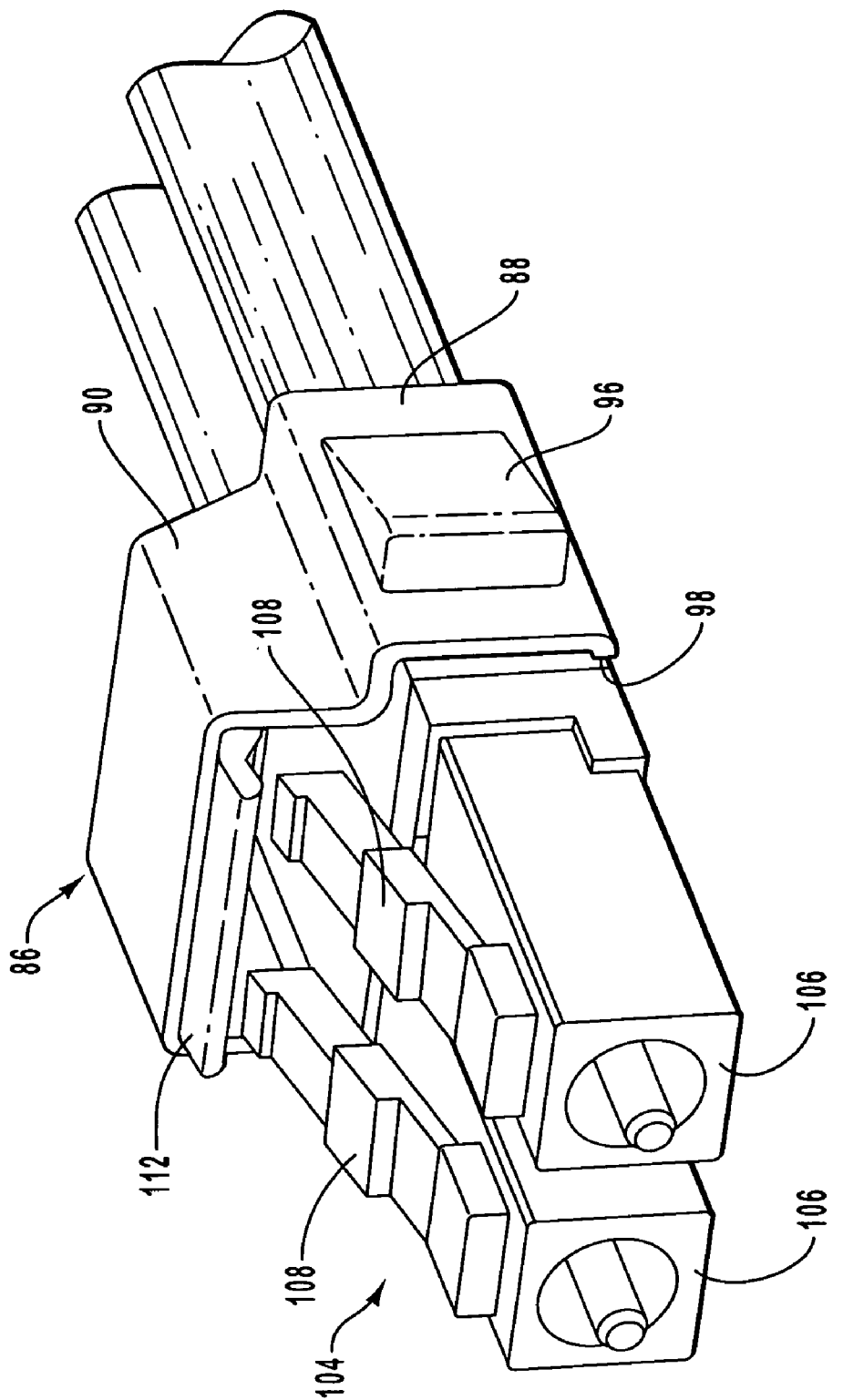
FIG. 6A is a perspective view of an optical fiber connector having the release sleeve of FIGS. 5A-5C slidably connected thereto, wherein the release sleeve is in a disengaged position.

FIG. 6A shows the release sleeve 86 slidably attached to a standard LC duplex connector 104, such as that used in FIG. 4 to optically connect with the optical ports 28 and 30 (FIG. 1) of one of the transceivers 20. The release sleeve 86 in FIG. 6A is shown in a disengaged position that is used when the LC duplex connector 104 is fully coupled with one of the transceivers 20 of the array system 10. In such a coupled position, the LC duplex connector 104 is received into the optical interface portion 32 of one of the transceivers 20 such that two connector tips 106 optically couple with the optical ports 28 and 30 of the transceiver. This causes two resilient clips 108 of the LC duplex connector 104 to engage with corresponding notches 110 (FIGS. 1, 2) formed on the optical interface portion 32 of the respective transceiver 20 to lock the LC duplex connector in a specified position.

As stated, the release sleeve 86 is shown in FIG. 6A in a disengaged position, wherein the release sleeve is slid along the LC duplex connector body in an axial direction away from connector tips 106. This position prevents substantial contact between the curved top inner surface 102 (FIG. 5C) of the release sleeve raised portion 90 and a connector latch 112 of the LC duplex connector 104. Correspondingly, the connector latch 112 is shown disengaged from adjacent ends of each resilient clip 108. This configuration ensures that a secure fit between the transceiver optical interface portion 32 and the LC duplex connector 104 is achieved.

Figure 6B:
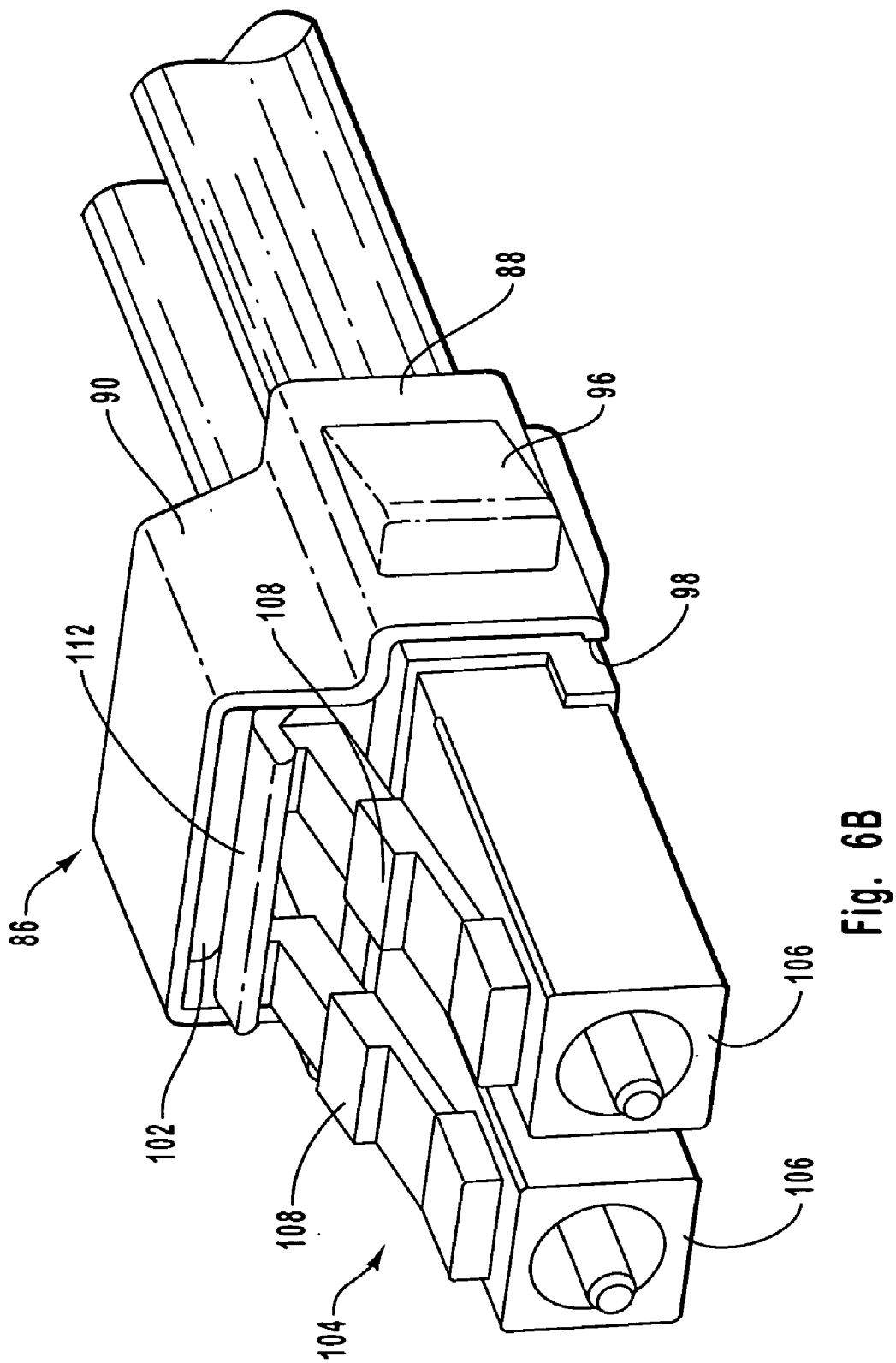
FIG. 6B is a perspective view of the optical fiber connector and release sleeve of FIG. 6A, wherein the release sleeve is in an engaged position.

In contrast, FIG. 6B shows the release sleeve in an engaged position, which is used to retract the LC duplex connector 104 from engagement with the optical interface portion 32 of the respective transceiver 20 of the array system 10. This position is achieved by sliding the release sleeve 86 along the LC duplex connector body in an axial direction toward the connector tips 106. This axial movement causes the curved top inner surface 102 of the release sleeve raised portion 90 to engage the connector latch 112 and force it into contact with each resilient clip 108 of the LC duplex connector 104. The resilient clips 108 in turn are forced downward to disengage each clip from the notches 110 of the respective transceiver 20. At this point, the LC duplex connector 104 can be removed from engagement with the optical interface portion 32 of the transceiver 20. Thus, it is seen that the release sleeve 86 enables insertion and removal of the LC duplex connector by virtue of its axial position with respect to the LC duplex connector, thereby obviating the need for direct manual manipulation of the LC duplex connector. Each transceiver of the array system can therefore be connected with an LC or other similar optical fiber connector via respective release sleeves as shown herein. Of course, the release sleeve can be adapted to operate with single or duplex connectors.

The release sleeve can be composed of any suitable material that allows it to function as described above. In one embodiment, the release sleeve is composed of injection molded thermoplastic. In another embodiment, the thermoplastic of the release sleeve further includes a specified percentage of glass fibers intermixed therewith. Alternatively, a variety of other resins can be used.

In addition to the above description, it is appreciated that the release sleeve can be adapted to operate with optical fiber connectors having physical characteristics that vary from that shown here. Moreover, the release sleeve can include designs or features in addition or alternative to those described herein.

It is noted that the array system shown in FIG. 1 includes transceivers mounted on one surface of the host board. In other embodiments, the array system can be expanded to include transceivers similarly packaged as shown in FIG. 1, but located on the opposing surface of the host board, in a "belly-to-belly" configuration to even further expand the number of transceivers of the host board. These and other modifications to the present invention are therefore contemplated as residing within the claims of the present invention.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical device, comprising:
   an optical transceiver module array system, including:
      a host board;
      a plurality of daughter cards that are each operably connected to the host board; and
      a plurality of transceiver modules;
      a plurality of cages, wherein each cage is connected to a respective one of the plurality of daughter cards, and wherein each cage receives a respective one of the plurality of optoelectronic modules; and
      a latching mechanism that is attached to each transceiver module, comprising:
         a rotatable bail; and
         a pivot block having a lock pin, the pivot block being pivotally attached to the rotatable bail, wherein the lock pin engages a portion of the optical transceiver module array system when the bail and the pivot block are positioned in a specified configuration to selectively secure the transceiver module, wherein each latching mechanism further includes two curved recesses that are defined in surfaces of the respective transceiver module to each movably receive an end portion of the bail.

2. An optical device as defined in claim 1, wherein the lock pin engages a portion of the respective cage that receives the transceiver module.

3. An optical device defined in claim 1, wherein the plurality of daughter cards are each operably connected perpendicularly to the host board, the plurality of daughter cards being positioned parallel to one another; and
   wherein the plurality of transceiver modules are each removably connected to the respective one of the daughter cards such that a surface defining the width of each transceiver module is positioned parallel to a surface of the respective daughter card, the daughter card surface being perpendicular with respect to the host board.

4. An optical transceiver module array system as defined in claim 1, wherein each transceiver module includes an outer housing.

5. An optical transceiver module array system, comprising:
   a host board;
   a plurality of daughter cards connected to the host board;
   a plurality of transceiver modules;
   a plurality of cages that are each connected to a respective one of the daughter cards, each cage being configured to removably receive a respective one of the transceiver modules; and
   a latching mechanism that is attached to one of the transceiver modules, comprising:
      a rotatable bail; and
      two curved recesses that are defined in surfaces of the respective transceiver module to each movably receive an end portion of the bail.

6. An optical transceiver module array system as defined in claim 5, wherein a connector receptacle is included on each daughter card to electrically connect the transceiver module to the respective host board.

7. An optical transceiver module array system as defined in claim 5, wherein each cage provides a ground plane for the respective transceiver module.

8. An optical transceiver module array system as defined in claim 5, wherein each transceiver module includes two optical ports, and the daughter boards are perpendicular to the host board.

9. An optical transceiver module array system as defined in claim 5, wherein at least one of the plurality of transceiver modules is a removable SFP or a XFP transceiver module and includes a single or a double fiber connector.

10. An optical transceiver module array system as defined in claim 5, wherein each transceiver module includes an outer housing that is received within a respective one of the cages when the transceiver modules are removably received within a respective one of the cages.

11. An optical transceiver module array system as defined in claim 5, wherein each transceiver module includes an outer housing.

12. An optical transceiver module array system as defined in claim 5, wherein the plurality of daughter cards are each perpendicularly connected to the host board, the plurality of daughter cards being positioned parallel to one another; and
wherein the plurality of transceiver modules are each received by a respective one of the cages, wherein the cages and daughter cards are positioned such that spacing between each transceiver module is minimized.

13. An optical tranceiver module array system as defined in claim 5, wherein the at least two tranceiver modules are connected to opposite sides of the at least one of the daughter cards.

14. An optical transceiver module array system as defined in claim 5, wherein at least two optoelectronic modules are connected to the same side of at least one of the daughter cards.

15. An optical transceiver module array system as defined in claim 5, wherein a daughter card surface of each daughter card includes a connector receptacle for removably receiving a card-edge connector of a respective one of the plurality of transceiver modules.

16. An optical transceiver module array system as defined in claim 5, wherein each cage is three-sided and provides electromagnetic shielding for the respective optoelectronic module.

17. An optical transceiver module array system as defined in claim 5, wherein the latching mechanism further comprises a lock pin that engages a hole defined in the respective cage to secure the optoelectronic module.

18. An optical transceiver module array system, comprising:
a host board;
a plurality of daughter cards that are each connected to the host board;
a plurality of cages that are each connected to a respective one of the daughter cards, wherein each cage provides a ground plane for the respective transceiver module; and
a plurality of transceiver modules that are each received by a respective one of the cages;
a connector receptacle included on each daughter card to electrically connect the transceiver module to the respective daughter card and host board; and
a plurality of optical fiber connectors that are each connected to the optical ports of respective transceiver modules, wherein each optical fiber connector includes a release sleeve that is slidably engaged with the optical fiber connector, wherein the release sleeve includes a body defining open first and second ends, wherein a portion of the body further defines a curved inner surface.

19. An optical transceiver module array system as defined in claim 18, wherein each optical fiber connector is an LC duplex connector having a connector latch for disengaging the LC duplex connector from a respective one of the transceiver modules.

20. An optical transceiver module array system as defined in claim 19, wherein each release sleeve is shaped to correspond to the exterior shape of the respective LC duplex connector.

21. An optical transceiver module array system as defined in claim 18, wherein the release sleeve is selectively slidable between a first position and a second position, and wherein in the second position the curved inner surface engages the connector latch of the LC duplex connector to enable it to disengage from a respective one of the transceiver modules.

22. An optical transceiver module array system as defined in claim 18, wherein each cage defines a three-sided structure.

23. An optical transceiver module array system as defined in claim 18, wherein at least two of the optical transceivers are positioned on opposing surfaces of one of the daughter cards.

24. An optical transceiver module array system as defined in claim 18, wherein the release sleeves are composed of a thermoplastic material.

25. An optical transceiver module array system as defined in claim 18, wherein at least one of the plurality of transceiver modules is a removable SFP or a XFP transceiver module and includes a single or a double fiber connector.

26. An optical transceiver module array system as defined in claim 18, wherein the plurality of daughter cards are each perpendicularly connected to the host board, the plurality of daughter cards being positioned parallel to one another; and
wherein the cages and daughter cards are positioned such that spacing between each transceiver module is minimized, and wherein each transceiver module includes two optical ports that are oriented with respect to the host board such that an imaginary line that passes through a central portion of both optical ports intersects the host board at substantially a right angle.

27. An optical tranceiver module array system as defined in claim 18, wherein at least two cages are connected to opposite sides of at least one of the daughter cards.

28. An optical tranceiver module array system as defined in claim 18, wherein at least two cages are connected to the same side of at least one of the daughter cards.

* * * * *

UNITED STATES PATENT AND TRADEMARK OFFICE
CERTIFICATE OF CORRECTION

| | |
|---|---|
| PATENT NO. | : 7,350,984 B1 |
| APPLICATION NO. | : 10/716149 |
| DATED | : April 1, 2008 |
| INVENTOR(S) | : Togami et al. |

It is certified that error appears in the above-identified patent and that said Letters Patent is hereby corrected as shown below:

Col. 7
Line 8 change "a about" to --about--

Signed and Sealed this

Sixteenth Day of November, 2010

David J. Kappos
*Director of the United States Patent and Trademark Office*